United States Patent [19]

Steinke

[11] Patent Number: 4,969,353

[45] Date of Patent: Nov. 13, 1990

[54] SPARK PLUG WITH A PRESSURE MEASURING DEVICE

[75] Inventor: Leo Steinke, Waiblingen-Hegnach, Fed. Rep. of Germany

[73] Assignee: Robert Bosch GmbH, Stuttgart, Fed. Rep. of Germany

[21] Appl. No.: 453,041

[22] Filed: Dec. 12, 1989

Related U.S. Application Data

[63] Continuation of Ser. No. 353,344, May 17, 1989, abandoned, which is a continuation of Ser. No. 267,221, Nov. 2, 1988, abandoned, which is a continuation of Ser. No. 143,215, Jan. 7, 1988, abandoned, which is a continuation of Ser. No. 9,337, Oct. 9, 1986, abandoned.

[30] Foreign Application Priority Data

Apr. 23, 1985 [DE] Fed. Rep. of Germany ....... 3514597

[51] Int. Cl.$^5$ ........................................... G01M 15/00
[52] U.S. Cl. ..................................................... 73/115
[58] Field of Search .................... 73/35, 115, 116, 714

[56] References Cited

U.S. PATENT DOCUMENTS

| | | | |
|---|---|---|---|
| 903,090 | 11/1908 | Hopkins | 136/224 |
| 1,861,021 | 5/1932 | Martin | 73/115 |
| 2,738,677 | 3/1956 | Li | 73/714 |
| 3,505,862 | 4/1970 | List et al. | 73/115 |
| 4,193,647 | 3/1980 | Guess et al. | 73/35 |
| 4,494,401 | 1/1985 | Dobler et al. | 73/35 |
| 4,570,481 | 2/1986 | McLaurin | 73/152 |

FOREIGN PATENT DOCUMENTS 413428 5/1966 Fed. Rep. of Germany ........ 73/115

Primary Examiner—Robert Raevis
Attorney, Agent, or Firm—Michael J. Striker

[57] ABSTRACT

In a spark plug a longitudinal bore is arranged eccentrically in a housing. A housing part with a thicker wall thickness is thereby formed, and a pressure sensor is provided in a bore or this housing part, and therefore the pressure sensor is in direct connection with the combustion chamber. No structural outer changes are required on the housing, so that the spark plug can be installed without any problems in known arrangements.

8 Claims, 1 Drawing Sheet

SPARK PLUG WITH A PRESSURE MEASURING DEVICE

This is a continuation of application Ser. No. 353,344, filed May 17, 1989, which is a continuation of application Ser. No. 267,221, both now abandoned which in turn is a continuation of application Ser. No. 143,215, filed on Jan. 7, 1988, which in turn is a continuation of application Ser. No. 009,337, filed on Oct. 9, 1986, application Ser. No. 009,337 and 143,215 have been abandoned, and application Ser. No. 267,221 has been expressly abandoned.

BACKGROUND OF THE INVENTION

The invention relates to a spark plug with a pressure measuring device claim. In a known spark plug the pressure measuring device which is mounted within the spark plug housing is separated from the insulator and also from the combustion chamber by a thin walled inserted element. Therefore, the housing itself has only a relative thin outer wall and in view of the separate insert element the structure of the spark plug is expensive and complicated. In view of the inserted element the pressure measuring device reacts relatively sluggishly.

SUMMARY OF THE INVENTION

It is therefore an object of the present invention to provide a spark plug in which a pressure measuring device is immediately connected with a pressure chamber.

In keeping with these objects and with others which will become apparent hereinafter, one feature of the present invention resides, briefly stated, in a spark plug with a pressure measuring device in which a housing of the spark plug has an eccentrically arranged longitudinal opening which forms in the housing a housing part with a thicker wall, and a pressure measuring device is arranged in this housing part.

In such construction the pressure measuring device is directly connected with the pressure chamber. Thus, the pressure measuring device has a relative low reaction time and can therefore rapidly measure low pressure fluctuations. Since the pressure measuring device is fixedly mounted in a bore in the housing of the spark plug it has a great resistance against vibration. In other words it cannot change its position under the action of loads which occur during operation and therefore cannot cause any erroneous measurements. In view of the unsymmetric disposition of the center bore with the insulation element no outer structural changes of the housing of the spark plugs are required, so that the spark plug can be installed without any problems in hitherto known arrangements.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

One exemplified embodiment of the invention is illustrated in the drawing and is explained in more detail in the following.

DESCRIPTION OF PREFERRED EMBODIMENTS

Figure 2:
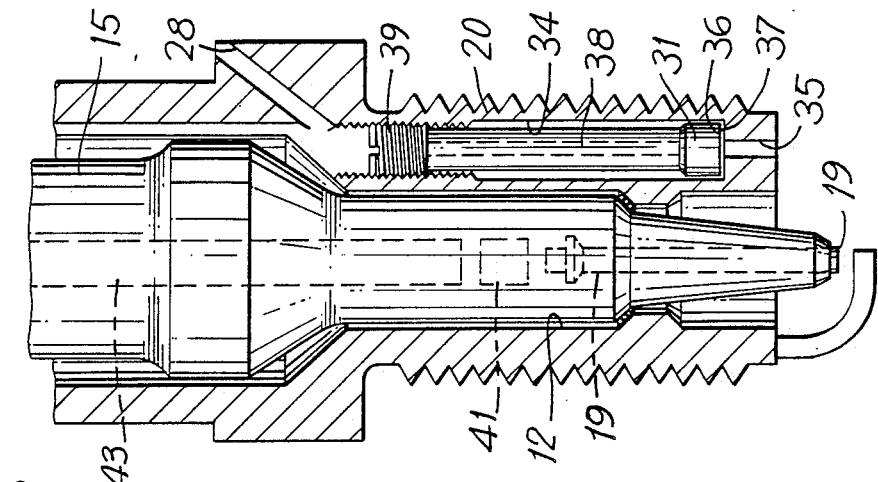
FIG. 2 shows the same section of the spark plug in accordance with another embodiment of the invention with FIG. 1.

A spark plug has a housing 10 with an eccentrically arranged longitudinal bore 12. The housing 10 can be screwed in customary manner with the assistance of an outer thread 13, into a motor block. The housing 10 is provided at its end facing the combustion chamber with a measuring electrode 14. An insulating element 15 is arranged in the longitudinal bore 12 and has an insulator tip 16 which faces the measuring electrode 14. Furthermore, the insulating element 15 is provided with a central longitudinal bore 18 for accommodating a connecting bolt 43 shown in dotted and a center electrode 19. The center electrode 19 and the measuring electrode 14 together form the spark path for the spark plug 11.

As a result of the eccentrical mounting of the longitudinal bore 12 the housing is provided with one housing part 20 having another housing part 21 having thick wall and a thin wall. In the housing part 20 with the thicker wall a pocket bore 22 is formed extending parallel to the longitudinal bore 12, a step bore 24 is provided at a bottom 23 of the pocket bore 22. The step bore 24 extends transversely to the pocket bore 22 and has a portion 25 of a smaller diameter, which in the area of the insulator foot tip 16 opens into a breathing chamber 26 of spark plug 11. An obliquely extending bore. An obliquely extending bore 28 is formed the area of approximately in a compression and heat shrinking zone 27 of the housing 10 and opens into the pocket bore 22.

A pressure sensor 31 is mounted in the step bore 24 and used for measuring the combustion pressures in the combustion chamber. This may be a customary known sensor with piezoelectric elements or also with piezo ceramic piezoresistive or electrodynamic elements. The pressure sensor 31 is in direct operating connection with the combustion chamber by means of the portion 25 of step bore 24. The electrical lines of the pressure sensor 31 lead to the outside through the pocket bore 24 and the bore 28 and to an evaluation device, not shown. A resistor 41 is mounted in the longitudinal bore 18 between the connecting bolt 43 and the center electrode 19.

Figure 1:
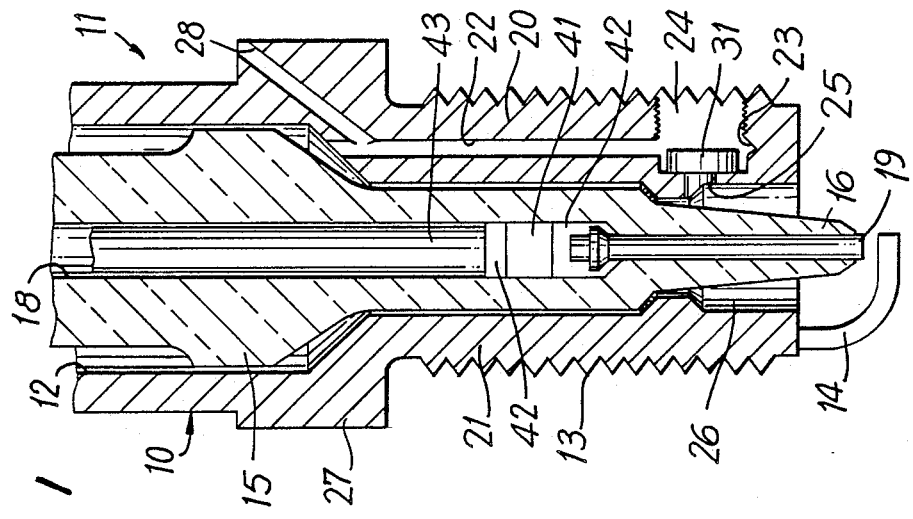
FIG. 1 shows a longitudinal section of a spark plug in accordance with one embodiment of the present invention.

In the embodiment shown in FIG. 2 the same parts are designated with the same reference numbers. A step bore 34 is formed in the housing part 20 with the thicker wall, parallel to the longitudinal bore 12 and is connected with bore 28. The bore portion 35 with the smaller diameter is directed toward the combustion chamber. A membrane 37 which is in operative connection with the pressure sensor 31 is mounted on a shoulder 36 of the step bore 34. As in the exemplified embodiment in accordance with FIG. 1, it can again be provided with piezoelectric, piezoresistive or electrodynamic elements. A sleeve like extension part 38 engages the pressure sensor 31 and maintains the pressure sensor 31 in its position. The extension part 38 is mounted in the step bore 34 by means of a screw 39. For obtaining interference free signals of the pressure sensor 31 a resistor suppressor is mounted between the connecting bolt and the center electrode 19.

It is important that the longitudinal bore 12 is formed eccentrically, so that the housing part 20 with a thicker wall is provided for of the pressure sensor 31.

The function of a spark plug is sufficiently known and is therefore not discussed in detail.

I claim:

1. A spark plug for an internal combustion engine having a combustion chamber, said spark plug comprising a housing having an eccentric longitudinal bore; an insulating member extending through said eccentric longitudinal bore and having a tip portion facing said combustion chamber; a center electrode received in said tip portion of said insulating member; and a pressure device for measuring pressure in the combustion chamber, said eccentric longitudinal bore defining a first housing wall portion having a first thickness and a second housing wall portion having a second thickness greater than said first thickness, said second wall portion having a further longitudinal bore communicating with the combustion chamber and having a lower portion adjacent to said tip portion of said insulating member, said pressure measuring device being located in said lower portion of said further longitudinal bore.

2. A spark plug as defined in claim 1, further comprising a connecting bolt; and a resistor arranged between said center electrode and said connecting bolt.

3. A spark plug as defined in claim 1, wherein said further bore extends parallel to said longitudinal bore of said housing.

4. A spark plug as defined in claim 1, wherein said pressure measuring device is provided with a piezoceramic element.

5. A spark plug as defined in claim 1, wherein said pressure measuring device is provided with a piezo resistive element.

6. A spark plug as defined in claim 1, wherein said pressure measuring device is provided with an electrodynamic element.

7. A spark plug for an internal combustion engine having a combustion chamber, said spark plug comprising an elongated one-piece internal housing having an eccentric longitudinal bore; an insulating member extending through said eccentric longitudinal bore and having a tip portion facing the combustion chamber; a center electrode received in said tip portion of said insulating member and a pressure measuring device mounted in said one-piece integral housing, said eccentric longitudinal bore defining a first housing wall portion having a first thickness and a second housing wall portion having a second thickness greater than said first thickness, said second wall portion having a further longitudinal bore communicating with the combustion chamber, said pressure measuring device being located in said further longitudinal bore.

8. A spark plug for an internal combustion engine having a combustion chamber, said spark plug comprising an elongate one-piece integral housing and an eccentric longitudinal bore and an outer thread for mounting said spark plug in the internal combustion engine; an insulating member extending through said eccentric longitudinal bore; a center electrode supported in said insulating member; and a pressure device for measuring pressure in the combustion chamber, said eccentric longitudinal bore defining a first housing wall portion having a first thickness and a second housing wall portion having a second thickness greater than said first thickness, said second wall portion having a further bore communicating with the combustion chamber, said pressure measuring device being located in said further longitudinal bore of said second housing wall portion in a region of said outer thread.

* * * * *

UNITED STATES PATENT AND TRADEMARK OFFICE
CERTIFICATE OF CORRECTION

PATENT NO. : 4,969,353

DATED : November 13, 1990

INVENTOR(S) : Leo Steinke

It is certified that error appears in the above-identified patent and that said Letters Patent is hereby corrected as shown below:

Column 4:

In claim 7, line 3, change "internal" to --integral--, in claim 8, line 3, change elongate" to --elongated--;

Signed and Sealed this

Tenth Day of November, 1992

Attest:

DOUGLAS B. COMER

*Attesting Officer*   Acting Commissioner of Patents and Trademarks